(12) United States Patent
Bednash et al.

(10) Patent No.: US 11,868,495 B2
(45) Date of Patent: Jan. 9, 2024

(54) CYBERSECURITY ACTIVE DEFENSE IN A DATA STORAGE SYSTEM

(71) Applicant: RackTop Systems, Inc., Fulton, MD (US)

(72) Inventors: Eric Bednash, Fulton, MD (US); Jonathan Halstuch, Fulton, MD (US); Nicholas Louis Mezei, Catonsville, MD (US); Garrett Eugene D'Amore, San Marcos, CA (US)

(73) Assignee: RackTop Systems, Inc., Fulton, MD (US)

( * ) Notice: Subject to any disclaimer, the term of this patent is extended or adjusted under 35 U.S.C. 154(b) by 104 days.

(21) Appl. No.: 17/521,676

(22) Filed: Nov. 8, 2021

(65) Prior Publication Data

US 2022/0156396 A1   May 19, 2022

Related U.S. Application Data

(60) Provisional application No. 63/113,697, filed on Nov. 13, 2020.

(51) Int. Cl.
| | | |
|---|---|---|
| *G06F 21/62* | (2013.01) | |
| *G06F 21/55* | (2013.01) | |
| *G06F 21/44* | (2013.01) | |
| *G06F 21/56* | (2013.01) | |

(52) U.S. Cl.
CPC ........ *G06F 21/6218* (2013.01); *G06F 21/445* (2013.01); *G06F 21/554* (2013.01); *G06F 21/568* (2013.01); *G06F 2221/2101* (2013.01)

(58) Field of Classification Search
CPC .. G06F 21/6218; G06F 21/445; G06F 21/554; G06F 21/568; G06F 2221/2101; G06F 21/62; G06F 21/55
See application file for complete search history.

(56) References Cited

U.S. PATENT DOCUMENTS

| | | | |
|---|---|---|---|
| 7,293,133 B1 | 11/2007 | Colgrove et al. | |
| 11,032,301 B2* | 6/2021 | Mandrychenko | ..... G06F 21/552 |
| 11,409,868 B2* | 8/2022 | Reid | ..................... G06F 21/554 |
| 2002/0161855 A1 | 10/2002 | Manczak et al. | |
| 2007/0136308 A1 | 6/2007 | Tsirigotis et al. | |
| 2007/0179995 A1 | 8/2007 | Prahlad et al. | |
| 2012/0197941 A1* | 8/2012 | Metzger | .................. G06F 16/21 |
| | | | 707/783 |
| 2013/0111262 A1 | 5/2013 | Taylor et al. | |
| 2013/0138908 A1 | 5/2013 | Iwasaki | |
| 2013/0282662 A1 | 10/2013 | Kumarasamy et al. | |
| 2014/0006465 A1 | 1/2014 | Davis | |
| 2015/0293699 A1 | 10/2015 | Bromley et al. | |

(Continued)

*Primary Examiner* — Quazi Farooqui
(74) *Attorney, Agent, or Firm* — Carr & Ferrell LLP

(57) ABSTRACT

Cybersecurity active defense in data storage systems are disclosed herein. An example system includes a file system, and an architecture installed on the file system, the architecture being configured to protect the file system in a zero trust manner from a malicious attack by a source system, the architecture including a controller that is configured to determine file-level operations of files in the file system that are indicative of a malicious event, block a user account or machine address interacting with the files, prevent data exfiltration or data corruption of the files, and provide an alert to an administrator regarding the files.

18 Claims, 12 Drawing Sheets

(56) References Cited

U.S. PATENT DOCUMENTS

| | | |
|---|---|---|
| 2016/0094570 A1* | 3/2016 | Hunt .................... G06F 21/566 |
| | | 726/24 |
| 2017/0075907 A1 | 3/2017 | Goswami et al. |
| 2018/0101678 A1* | 4/2018 | Rosa ....................... G06F 21/32 |
| 2018/0159929 A1* | 6/2018 | Heckle ............... H04L 67/1095 |
| 2019/0205056 A1 | 7/2019 | Haltstuch et al. |
| 2019/0258782 A1* | 8/2019 | Lerner .................. G07C 9/257 |
| 2019/0260781 A1* | 8/2019 | Fellows ............... H04L 63/101 |
| 2022/0156395 A1 | 5/2022 | Bednash et al. |

* cited by examiner

Affected Files & Recommendations - Ryuk (Ransomware)

Type: [Any ▼]  Search: [_____]  Snapshot Limit: [- 10 +]  ☐ Hash Files  ☑ Show Resolved As of 16s ago analyzed 707 operations in 184ms

Recover
Detected: /storage/p01/gobal//VNA/Active Q2/1 Wing East/Learning Example/IMG_2065.JPG
9/9/2021 3:19 PM          modified 1.12y before detection 7/26/2020 5:45 PM - 9/9/2021 3:19 PM 1.12y 10 Snapshots
Currently: file not present in active file share
3.34MB
[Restore]

Remove
Detected: /storage/p01/gobal//VNA/Active Q2/1 Wing East/Learning Example/IMG_2065.JPG.RYK
9/9/2021 3:19 PM
Currently: 3.34MB modified 21ms before detection 9/9/2021 3:19 PM
[Delete File] [Quarantine File]

Recover
Detected: /storage/p01/gobal//VNA/Active Q2/1 Wing East/Learning Example/IMG_2256.JPG
9/9/2021 3:19 PM          modified 1.11y before detection 8/1/2020 1:49 PM - 9/9/2021 3:19 PM 1.11y 10 Snapshots
Currently: file not present in active file share
3.24MB
[Restore]

Remove
Detected: /storage/p01/gobal//VNA/Active Q2/1 Wing East/Learning Example/IMG_2256.JPG.RYK
9/9/2021 3:19 PM
Currently: 3.24MB modified 35ms before detection 9/9/2021 3:19 PM
[Delete File] [Quarantine File]

CYBERSECURITY ACTIVE DEFENSE IN A DATA STORAGE SYSTEM

CROSS REFERENCE IO RELATED APPLICATIONS

This application claims the benefit and priority of U.S. Provisional Application Ser. No. 63/113,697, filed on Nov. 13, 2020, which is hereby incorporated by reference herein in its entirety, including all appendices and references cited therein, for all purposes.

TECHNICAL FIELD

This disclosure is related to the technical field of network and computer security. More specifically, systems and methods for providing cybersecurity active defense for unstructured files in a data storage system are described herein.

SUMMARY

According to some embodiments, the present disclosure is directed to a system includes a network-based file system, and an architecture installed on the file system, the architecture being configured to protect the file system in a zero trust manner from a malicious attack by a source system, the architecture including a controller that is configured to determine file-level operations of files in the file system that are indicative of a malicious event, block a user account or machine address interacting with the files, prevent data exfiltration or data corruption of the files, and provide an alert to an administrator regarding the files.

According to some embodiments, the present disclosure is directed to a method comprising detecting malicious activity at a file protocol level of a file system, denying access to the file system for a cause of the malicious activity, notifying an administrator of the malicious activity, generating an audit log of the malicious activity and, restoring files that were affected by the malicious activity between when the malicious activity was identified and when the access was denied.

BRIEF DESCRIPTION OF DRAWINGS

Exemplary embodiments are illustrated by way of example and not limitation in the figures of the accompanying drawings, in which like references indicate similar elements.

FIG. 3 is a screenshot of an example user interface that can be used to recover files affected by the identified ransomware event.

DETAILED DESCRIPTION OF EXAMPLE EMBODIMENTS

Overview

Figure 1:
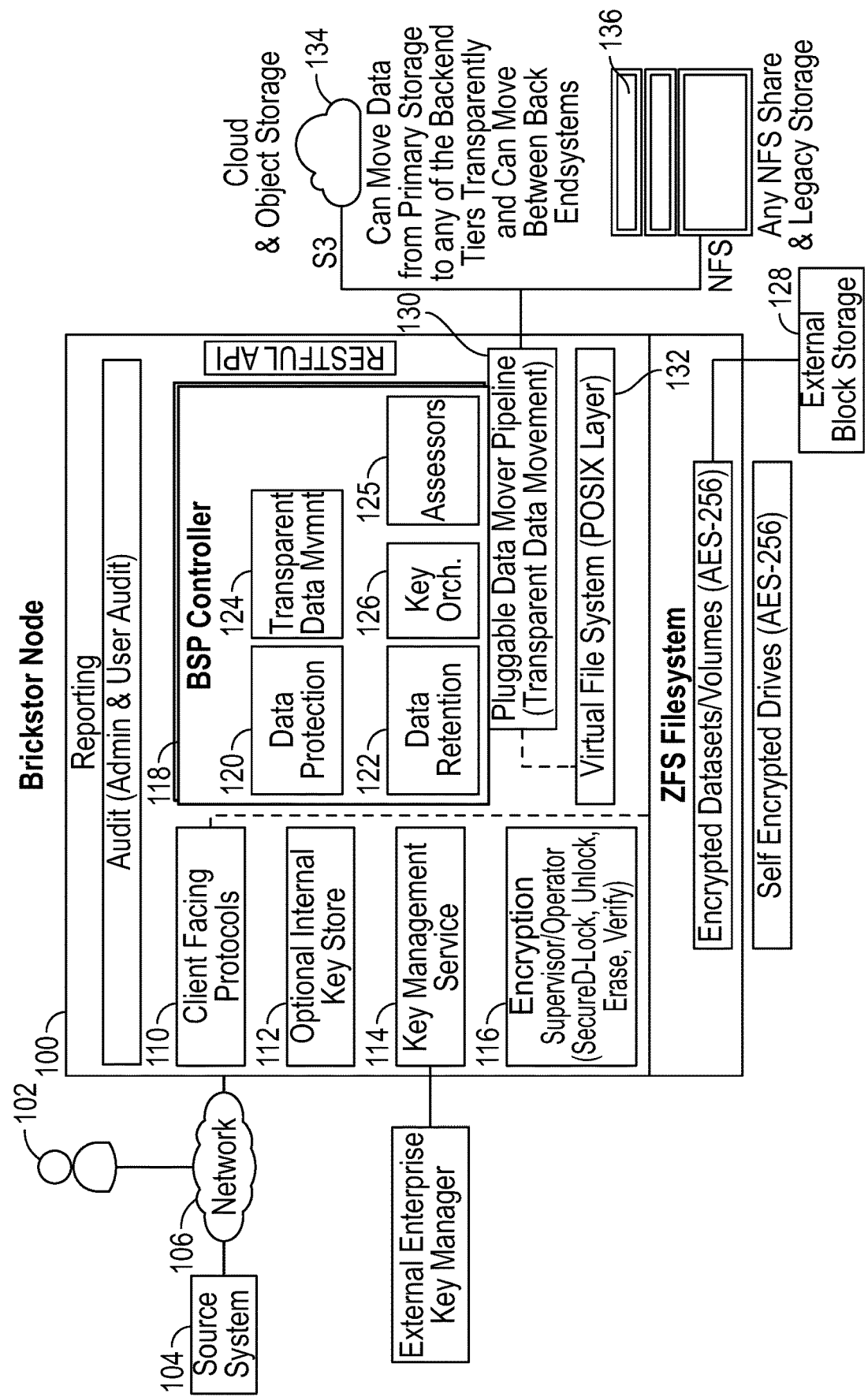
FIG. 1 is an example architecture where aspects of the present disclosure can be implemented for use.

Unstructured file systems (also referred to herein as Network Attached Storage (NAS) systems) use privileged user access controls, but they are vulnerable when user accounts are hijacked through a ransomware attack or a malware attack and increase the damage that such an attack can do to a business, company or organization. Unfortunately, using traditional methods, it may take weeks or months to detect, determine and access the extent of the damage that was caused by a ransomware or a malware attack, as one of the initial steps towards data recovery.

Specifically, there is a need to monitor, detect and stop malicious activity from occurring in real-time in a NAS system, to address the security issues that arise in the context of ransomware and malware attacks. If the malicious activity is stopped early enough, then the ransomware attack may be successfully defeated since potentially no data may be exfiltrated or encrypted.

Unstructured data accounts for approximately 80-90% of the data in most organizations today. By 2023, it is estimated that unstructured data will account for 93% of all data worldwide. And in 2020 damage from ransomware exceeded $20 billion. This explosion of unstructured data and evolving cyber threats has introduced new challenges for infrastructure teams and the C-suite beyond storage density and performance. With information technology decisions being more influenced by security and compliance, the requirement to protect data from natural disasters, breaches, insider threats, and cyberattacks has become critical. To effectively protect data, an organization needs a way to understand where the data resides, the sensitivity of the data, and who has access to each file. Data critical to business operations should be available to enable and accelerate positive business outcomes, but this need creates significant demands on data agility, mobility, and privacy—just to name a few.

The present disclosure pertains to a data security platform that fuses advanced cyber and metadata intelligence capabilities with a high-performance, unstructured file platform to solve the most difficult and pressing problems of ransomware, data theft, insider threats, and regulatory compliance. This fusion of technology is defined as CyberConvergence, which is rooted in the principles of zero trust.

Some embodiments include storage systems that remove the burden of typical multivendor solutions with a single, easy-to-use convergence of storage and cybersecurity on one platform that is far easier and faster to implement and manage. Having a single integrated solution results in a significantly lower total cost of ownership.

An example data storage system of the present disclosure can be embedded with military-grade security, using multiple levels of encryption, built-in key management, and data protection with immutable snapshots. These features in combination with user behavior analysis and proactive remediation result in a solution that is actively protecting data stored on the data storage system.

The systems and methods herein provide a Zero Trust and a data centric model. To be sure, Zero Trust is a model for implementing security and explicit trust at every level of an IT architecture. While traditional Zero Trust focused predominantly on network security, these systems and methods have evolved the concept to include data security so that the most critical assets are protected not just when they are in-flight on the network, but also when they are at rest within the data system.

To successfully employ this concept, a change in perspective switches the context of enterprise architectures and security from the "network" to the "data". Once data becomes the focal point of security, the insufficiencies, gaps, and vulnerabilities of existing data storage technologies become very apparent. One example system is referred to as the BrickStor Security Platform (hereinafter "BSP system").

The BSP system can implement policy-based data management. That is, the BSP system can use policies to ensure data storage is properly provisioned and maintained in accordance with best practices and organizational governance. This approach enables user self-service and workflow automation with centralized governance. The BSP system uses workload-based storage profiles that reduce or eliminate the need for admins or users to determine the best storage and security settings. This approach allows the storage system to automatically optimize itself for the workload. Each storage profile has an associated data protection profile that automatically starts when new storage is provisioned, thus ensuring data is protected against natural disaster, human error, or cyber-attack.

Many regulations and standards (e.g. NIST standards) that are relevant in commercial and government sectors focus on the same controls relative to data. These controls mainly focus on data security, access control, and data retention. The BSP system simplifies compliance by enabling users to set policies and controls on the data to maintain continuous compliance. Audits and compliance require an organization to explain how they deploy the controls and demonstrate control compliance through a body of evidence. BSP system is designed to meet these controls and provide exportable and immutable evidence, such as logs or daily reports. Three primary examples of these standards include data encryption for data security, privileged access management, and data protection policies for data retention.

Traditional storage solutions require external, network-based, third party compliance software to scan network shares, review permissions, and detect sensitive content in data. There are two significant security and performance pitfalls with this approach. First, these external tools require a privileged user account to scan all data, which creates an undefendable attack vector for cyber attackers to exploit. Privileged service account attacks are nearly impossible to detect because their normal activity is similar to data exfiltration. Second, external tools place a significant load on the system by stealing bandwidth and IOPS from the operational use of the storage and polluting the cache with unnecessary data. With a CyberConverged approach, data is analyzed internally, negating the need for a privileged account. That attack vector is eliminated entirely, allowing faster response when under attack. Since data is being analyzed as it is written to the BSP system, there is no need for extra expensive I/O or adjusting cache policies.

In some embodiments, systems and methods disclosed herein describe an active defense capability that is embedded within a storage system to detect and stop a malicious activity, such as a ransomware attack, from occurring in real time or near real-time within the storage system.

In certain embodiments, the systems and methods described herein enable data stored within the protected data storage system to detect and stop the spread of malicious activity, including but not limited to, ransomware attacks, data exfiltration attacks, insider threats, and data destruction attacks. Specifically, embodiments described herein provide for a real-time or near real-time analysis of data as it is being operated on, including all data and metadata operations (read/write/modify/metadata operations), for detecting attack patterns.

Furthermore, in exemplary embodiments, the system detects, in real time or near real time, a wide range of attacks, including but not limited to, attacks by a malicious insider, unusual amounts of data being transferred, data access from an unusual or unknown IP address, any type of intrusion or breach, malicious activity or any other activity that is unusual for a user's account that may potentially rise to the level of a security breach or a malicious attack on the NAS system.

Furthermore, the system can not only detect a malicious intruder or unauthorized user, but it can also stop the malicious activity that is taking place in real time or near time. In some embodiments, the system will cut off the intruder's access to the storage system altogether, thereby stopping the attack from occurring. Also, the system will alert the system administrator that an attack is occurring, so that the system administrator can immediately investigate, conduct forensic investigation, and take any further corrective actions as needed.

The data that is typically protected by the system as described herein is the corporate data or the important central business data of the organization, as opposed to other types of data. In exemplary embodiments, the system can perform real time data collection, real time data analysis, and post-analysis on the whole body of data for any given period of time.

Referring now to FIG. 1, which illustrates an example architecture of a BSP system 100, which is a protected storage system, a client 102, source system 104, and a network 106. The network 106 can include combinations of networks. For example, the network 106 may include any one or a combination of multiple different types of networks, such as cellular, cable, the Internet, wireless networks, and other private and/or public networks. The network can include both short and long-range wireless networks.

Prior to describing the BSP system 100, various definitions that may be used herein will be provided for purposes of clarity of description. The client 102 or user will be understood to refer to a system that is used to access data from a file storage system 108 of the BSP system 100 over the network 106. The source system 104 is a computer or device where the malicious behavior is originating from. Some embodiments and use cases may refer to the use of S3 (Simple Storage Service protocol), SMB (server message block file sharing protocol) and/or NFS (network file system file sharing protocol). For example, the client 102 can use SMB, NFS, and/or S3 (or other equivalent protocol) to access the BSP system 100.

As noted above, the BSP system 100 can implement a CyberConverged data security approach that leverages a high-performance, RAM (random access memory) centric architecture to deliver integrated security and compliance features in the ideal location of the data pipeline, without sacrificing IOPS (input/output operations per second) or exposing data through unnecessary privileged account.

The BSP system 100 employs a portable microservices architecture that works cooperatively with common interfaces to provide extensible data management capabilities. The BSP system 100 can comprise a secure read-only operating system that leverages the power of ZFS, a 128-bit file system, to provide advanced high-performance storage capabilities. The architecture is flexible and allows the BSP system 100 to front other storage solutions (both block and file), thereby enabling data security and compliance capabilities into an environment without completely having to replace legacy equipment. This same approach provides a secure and compliant mechanism to leverage cloud technologies such as an S3 compatible object store.

The BSP system 100 can include client facing interface 110, an optional internal key store 112, a key management service 114, and an encryption service 116. In some embodiments, a BSP controller 118 can include logic that comprises data protection 120, data retention 122, transparent data movement 124, and key orchestration 126. As noted above, the file storage system 108 includes a ZFS Filesystem that includes encrypted datasets and volumes. Encryption protocols can include AES-256 or another equivalent protocol. In some instances, self-encrypting drives can be used. An external block storage system 128 can be included in some embodiments.

In general, the BSP system 100 can be configured to detect and stop insider threats and ransomware attacks. The BSP system 100 automatically maintains immutable copies of individual files or the entire file system for rapid file level recovery. The BSP system 100 instantly reports on what files were accessed, as well as alerts security and infrastructure teams via email and webhooks. The BSP system 100 also provides automatic incident reporting, customized responses, and integrates with SIEMs and SOARs.

A pluggable data move pipeline 130 can be coupled to a virtual file system (POSIX "Portable Operating System Interface") layer 132, which in turn provides a virtual interface to the file storage system 108. The pluggable data move pipeline 130 allows for data transfer to cloud and object storage 134 and NFS share and legacy storage 136. In general, the pluggable data move pipeline 130 allows for transparent movement of data from primary storage to any backend tiers, as well as allowing for movement of data between backend systems, such as 134 and 136.

Broadly, the BSP system 100 provides a data-centric zero trust architecture with active defense and policy enforcement against unusual data access, ransomware, insider threats and excessive file access. The active defense features of the BSP system 100 can immediately alert security and infrastructure teams about suspicious behavior as well as block the suspicious user accounts and IP (Internet Protocol) addresses from accessing further data. As it pertains to ransomware, the BSP system 100 can be configured to create a cyber resilient architecture that stops and contains the ransomware attack, automatically generates an incident report and allows other non-offending users and applications to access data and continue to deliver critical services. The built-in incident management features make it easy to determine the source of the attack and immediately restore files that were affected from immutable snapshots and return the system to service quickly.

The BSP system 100 proactively protects unstructured data in the file storage system 108 using inline real time assessors that are looking for malicious and abnormal file activity conducted by a user or application. The BSP system 100 can implement active defense mechanisms that are extensible and can tie into an organization's security ecosystem through webhooks and email alerts. In addition to detecting abnormal access and employing a zero-trust evaluation model for file operations the BSP system 100 can enforce a cybersecurity data policy and stop an attack in real time before it is too late.

By default, the BSP system 100 has assessors 125 that detect, for example, excessive file access events such as reads, writes and deletes per data set. The assessors 125 can also detect unusual file access events, such as file access by a privileged account for example. For example, a privileged account, such as an administrator account, likely rarely performs file level actions. The BSP system 100 can also detect specific events, such as ransomware and/or another malicious event.

The following descriptions reference additional figures individually, however, references may be made to FIG. 1 throughout. In some instances, multiple figures may be referred to collectively.

Figure 2:
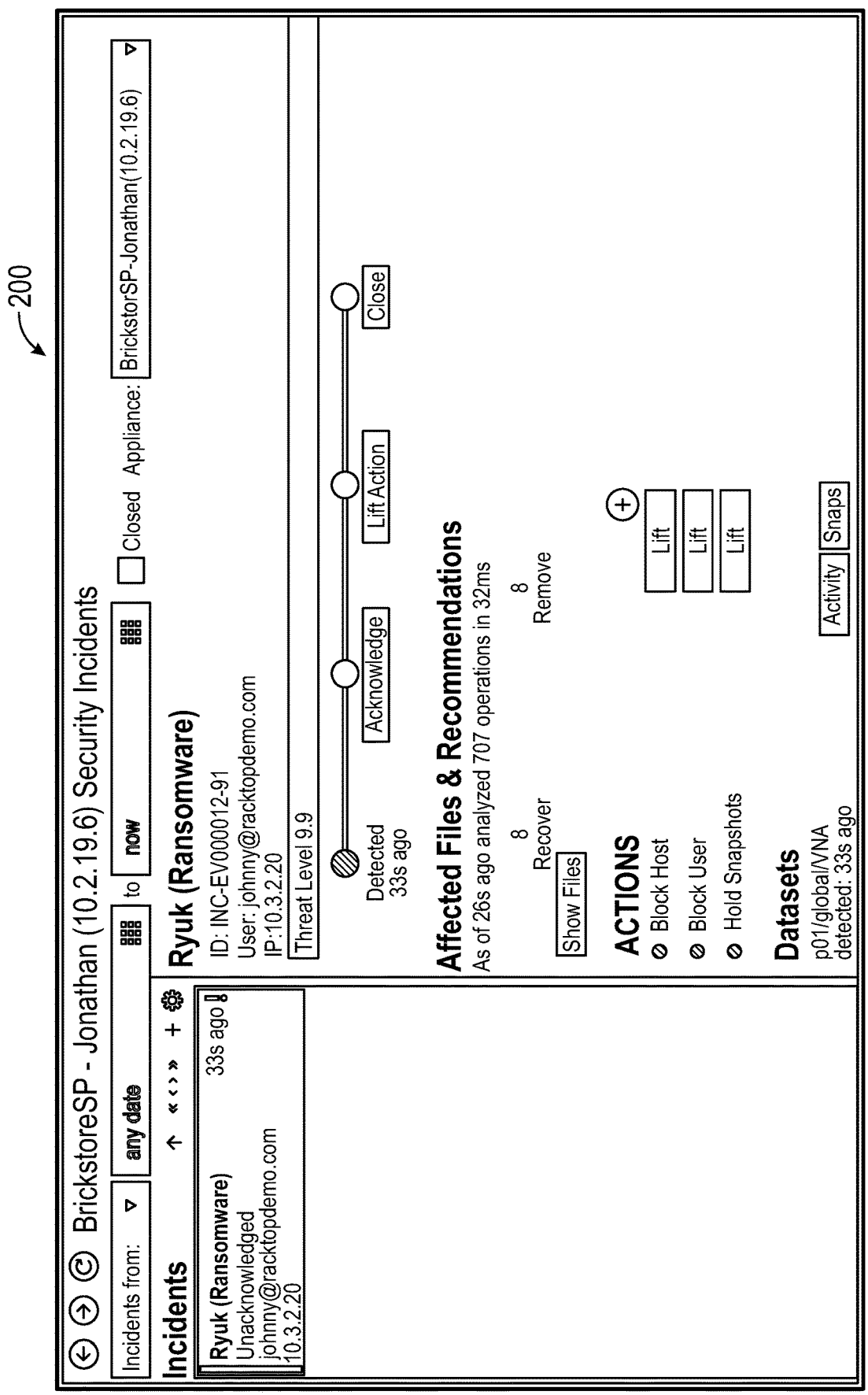
FIG. 2 is an example screenshot of an example incident report that identifies Ryuk ransomware event.

FIG. 2 is an example screenshot of an example incident report that identifies Ryuk ransomware event. The GUI 200 provides an event timeline that indicates when the malicious event was detected and acknowledged, as when certain actions "lift actions" were taken to remove blocks on certain IP addresses of users (such as source systems), as well as when the event was closed. The GUI 200 can identify how many files of the file storage system 108 were implicated in the attack. A user can select and see each of the files that were impacted, as well as remove the affected files. The GUI 200 also includes a listing of Actions. Actions that may be taken relate to specific accounts, source system identifiers, and other similar data related to the entity which were detected to be associated with the files that were the subject of the detected event. These accounts, addresses, users and so forth can be automatically blocked from accessing the file storage system 108. In addition to identifying users, machines, and/or networks implicated in the detected event, the admin can also choose to hold snapshots that were associated with the detected event. In instances where the admin determines that an account or machine was not involved in the detected event (or when the detected event was not actually malicious), the admin can remove a hold on the account or machine by selecting a "lift" button adjacent to the particular account or machine.

FIG. 3 is a screenshot of an example user interface 300 that can be used to recover files affected by the identified ransomware event. Each file is identified in terms of detection date and time, if the file has been removed from or sequestered in the file system, as well as if the file is available for deletion, quarantine, or restoration.

As noted above, the BSP system 100 can be configured to implement security policies. Organizations can add specific rules and incident responses based on their organizational needs. The BSP system 100 can function as another security sensor within a company's infrastructure to eliminate blind spots and detect attackers that may sidestep endpoints by going to devices that don't have endpoint monitoring. The BSP system 100 does not rely on agents but can audit all file access activity and inform a security team and other security applications for rapid response.

Figure 4:
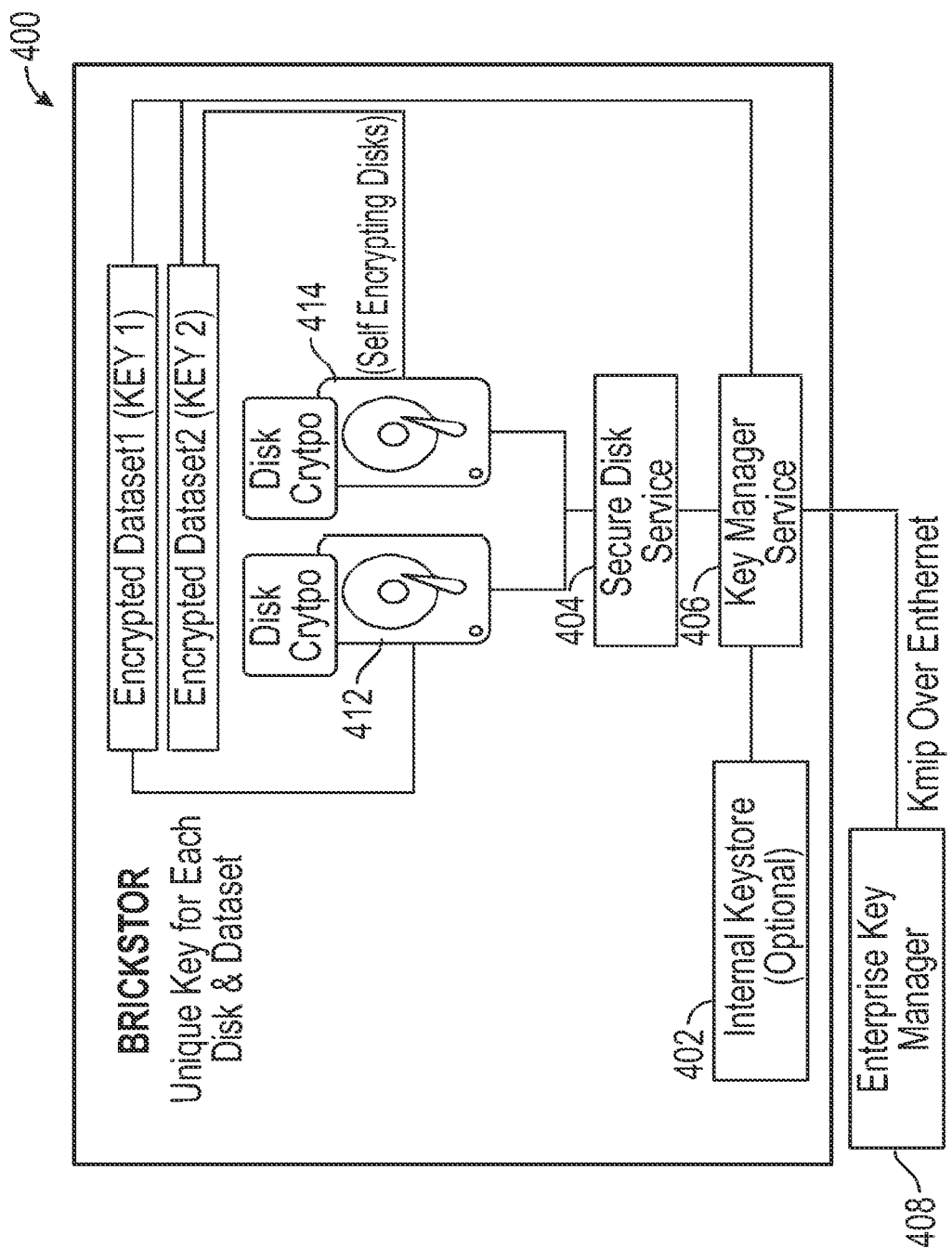
FIG. 4 schematically illustrates an example data encryption architecture that can be used by the BrickStor Security Platform (BSP) system.

FIG. 4 schematically illustrates an example data encryption architecture 400 that can be used by the BSP system 100. The architecture 400 comprises an optional internal keystore 402, a secure disk service 404, a key manager service 406, and an enterprise key manager 408.

BSP system 100 provides two levels of encryption for data at rest and in flight. For data at rest, a first level of encryption uses FIPS (federal information processing) AES-256 level 2 validated drives, such as drives 412 and 414. The key manager service 406 in conjunction with the secure disk service 404 provisions and manages the encrypted bands on the disk.

Data is automatically encrypted and decrypted at line speed as it is written and read to the disk. This applies to both data and cache devices. The secure disk service 404 can crypto-erase drives as well to meet NIST media sanitization requirements. This is accomplished nearly instantaneously by resetting the data encryption key to a new random key. The second level of encryption for data at rest is accomplished by uniquely encrypting each dataset or volume in the pool with AES-256 encryption that leverages the Intel AES-NI instruction set to provide secure and performance efficient encryption. This can be leveraged in conjunction with compression and deduplication as it occurs after the inline and deduplication pipeline. Dataset encryption can be enabled during dataset creation, providing at rest protection for all user data (e.g., file contents, names, and attributes).

The default encryption algorithm is AES-256. Each user data block on the disk is encrypted via a per-dataset random 256-bit master key, which is generated during dataset creation and is inaccessible outside of the kernel. A master key may be encrypted via a user-provided wrapping key to allow periodic key rotation, which is controlled by a fully audited key management policy engine. Wrapping keys are random 256-bit keys that are generated by the key manager or user-provided.

When using dataset encryption, replication users also receive the benefit of replicating data to another location (i.e., remote datacenter or the cloud) at a block level without having to expose the key to the remote site. This encrypted data is replicated over an encrypted channel, meaning the data is encrypted twice in flight. For recovery purposes, data can just be recalled from the remote site back to the primary site or the key can be provided to the remote site to decrypt the data and reconstitute operations. Administrators can define a policy for how keys should be forwarded, based on organizational security requirements. Most external or third-party block level backup or replication tools require the re-encryption of data and suffer from data ballooning during the process. This encryption takes full advantage of the existing data protection service's differential data blocks and does not suffer from re-encryption, ballooning, or inflation.

A key manager service 406 manages encryption key material as well as maintenance functions, such as automatic key rotation, periodic key verification, key activity auditing, and reporting. The key management daemon of the key manager service 406 can store keys in a secure local database, on a removable disk, or connect to a KMIP (Key Management Interoperability Protocol) compliant enterprise key manager. The key orchestration architecture allows customers to use their own key material to provide the highest-level trust in key material as is often required by government agencies and financial institutions. These features provide complete transparency to the user about what is encrypted, key verification, key rotation dates, and more through built in reporting. The policy engine enables users to set a key rotation policy that will enable requests for new keys on a defined schedule for automatically rotating keys in accordance with organizational policy.

The BSP system 100 is configured to provide unique User Behavior Auditing (UBA) capability is the perfect defense against cyber-attacks and insider threats. UBA provides a real-time stream of user activity which captures extensive detail including the identity, source IP address, and protocol. User behavior activity can be analyzed within end-user facing user interfaces, through a data manager, or automatically forwarded to an RFC 5424 compliant SIEM (security information and event management) or anomaly detection engine. The manager can provide a feature rich data visualization interface which displays top users, hot files, and activity outside of normal business hours. It can also easily help determine who moved or deleted a file, a common problem for many IT organizations today. Future improvements to the UBA engine include automatically acting on data anomalies or known patterns to kick off system policy or user prescribed workflows.

The BSP system 100 supports full integration with active directory and LDAP (lightweight directory access protocol) to maintain consistent identity and access control. When properly configured, the BSP system 100 is capable of cross protocol access to files via both NFS and SMB.

The BSP system 100 can employ multiple methods to ensure system integrity and operating system integrity. Autonomous communication between enabled devices and the cloud support infrastructure leverages a combination of mutual TLS (transport layer security) and fingerprinting technologies to eliminate spoofing. All communications paths are SSL encrypted using SHA2 algorithms and management services support TLS inbound connections.

The BSP system 100 can expose an API (application programming interface) using signed JWT (JASON web) tokens with RSA (Rivest-Shamir-Adleman) signature verification. Endpoints (e.g., clients and/or enabled data stores) are additionally secured with access control permissions tied to Active Directory™ user accounts. The operating system and upgrades are deployed as read-only images that are cryptographically signed and verified before installing. Operating systems are not installed like typical software. Instead, the BSP system 100 provides a secure RAP (resource allocation profile) format that enables images to be deployed in a similar manner to firmware on a hardware chip.

The BSP system 100 supports staging updates and rebooting during convenient hours. Multiple images can be loaded on the system at one time, which allows for booting into older images in the instance of an incompatibility. The BSP system 100 does not suffer from traditional complications, such as patch ordering issues and library variability because of the RAP deployment model. The entire OS can persist in a RAM disk, which means alterations to binaries will not persist. Configuration data can be saved between reboots. This "stateless" approach provides optimal security and ease of lifecycle management.

Administrators can run NIST compliant media sanitization operations in the BSP system 100 that may erase the data on the disk before re-purposing the system or destroying it. Metadata and access control settings are all stored with the data on the data pools. Thus, the controller may not require any reconfiguration or prior information about storage pools to import them, which guarantees 100% data portability even when some disks are missing. The controller can read all the necessary metadata from any member disk in the pool and self-configure and prepare shares from the data contained within the pool. For bulk data transfers, drives can be transported in an encrypted and locked state from one site to another. The keys can be separately transmitted electronically. When the disks arrive at the other site, the system will be able to unlock the drives and read all the data and access control settings from the pool, making them immediately available for use.

Figure 5:
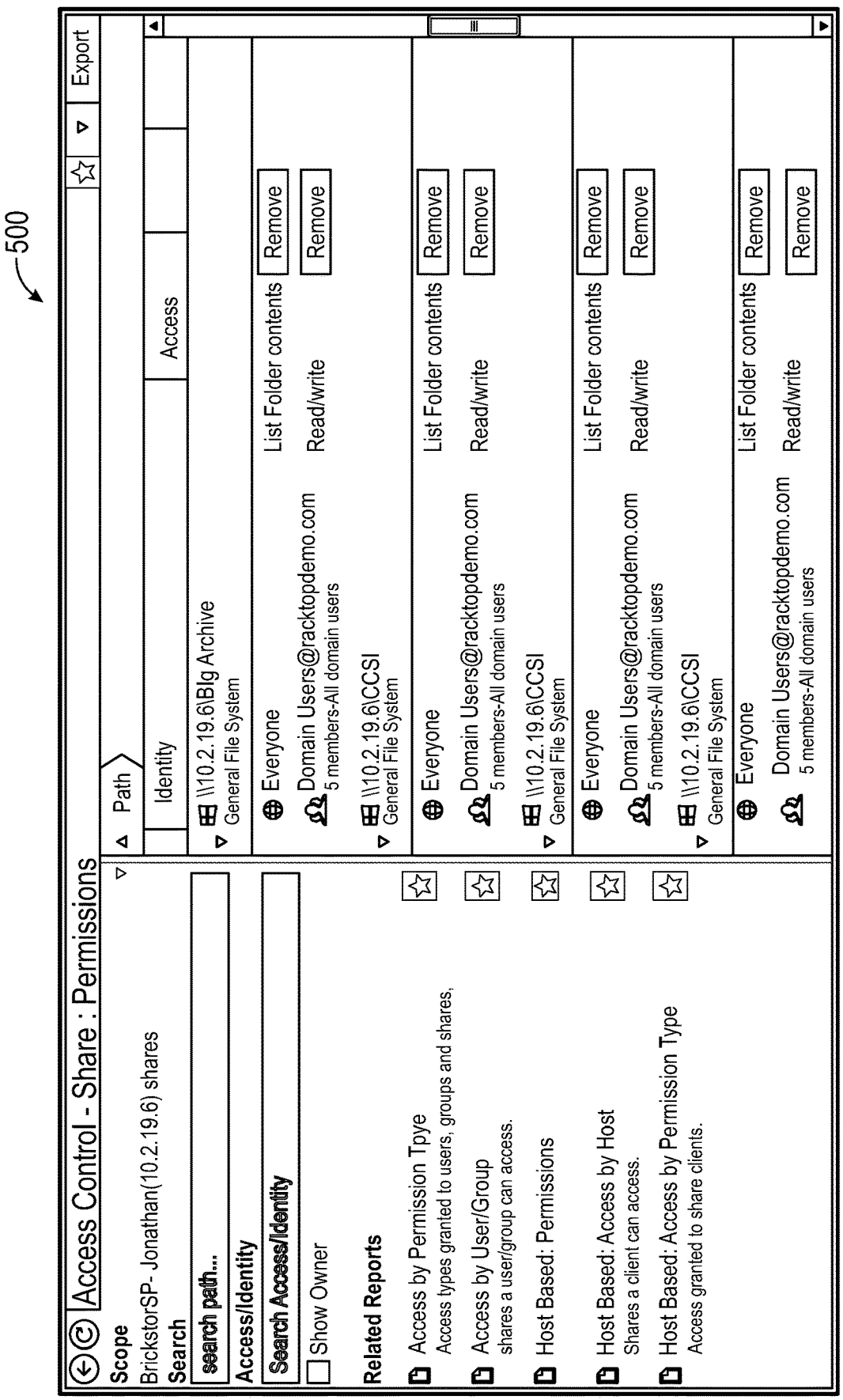
FIG. 5 is a screenshot of an example user interface that allows an admin to review permissions to the network file share and remove permissions or export the report for review by another stakeholder.

Referring now to FIG. 5, the BSP system 100 is configured to provide privileged access management. The BSP system 100 integrates with Active Directory/LDAP to enable data owners to review access control permissions. Data owners can see in real time what groups and users have access to a specified network share or review what network shares a user or group has access to on the BSP system 100. This built in capability can be extended into a workflow to provide data owners the ability to periodically review access management and acknowledge that access settings are still appropriate to meet the intent of the NIST standards. Furthermore, the system can create temporary access control permissions, so that users will have expiring access to a network share based on a temporary need or project task. This data owner centric approach puts the control with the people who have equities in the data and eliminates the storage admin as a middleman or obstacle to accurate and effective access management. Changes to access control settings can be logged for review and compliance purposes. In the event of a ransomware attack, explicit deny controls are placed at the top of the access control tree to prevent data exfiltration or continued corruption as illustrated in the GUI 500 of FIG. 5.

With respect to data retention, the BSP system 100 can implement a data protection engine that includes a collection of services which manage automatic snapshot creation, expiration, and retention based on pre-defined policies. Data protection is always on, and inherent, which means that as new datasets are created, admins never have to remember to include that data. Custom retention holds can easily be added to override policy-based expirations. Users can also extend, reduce, or completely remove the original expiration period for the snapshot.

The BSP system 100 supports legal holds that can be assigned unique identifiers, such as project ID or investigation ID. This prevents data from expiring based on the normal expiration date to meet legal or special requirements.

Reports accessible through the BSP system 100 quickly display which datasets have current holds. Any data with a hold on it cannot be destroyed by any mechanism until all holds have been removed. Built-in retention reports allow users to review and monitor all data protection policies to ensure they are compliant with the organization's IT governance standard. Any deviations can be put back into compliance from within the interactive reporting screen. If retention standards change, admins can review current policies and adjust them to meet the new minimums or maximums. For example, if an organization's previous policy only required three years of data retention but a new policy requires seven years of data retention, an admin can change all appropriate policies system wide to increase retention from a single compliance screen in just a few clicks.

Administrative actions are audited and logged in a local database and can also be forwarded to an RFC 5242 compliant data store. This provides a complete accounting of all changes to the system that have been made, including changes in access control. This data can be reviewed within the BSP system 100 or with log forwarding on an external SIEM. The audit capability can also provide insightful information about who had access to data when performing forensic analysis or e-discovery. Providing a rapid understanding of what happened after an event, such as a cyberattack, data loss, or malware incident can be invaluable in salvaging a reputation and providing accurate information to public relations and legal counsel.

Figure 6:
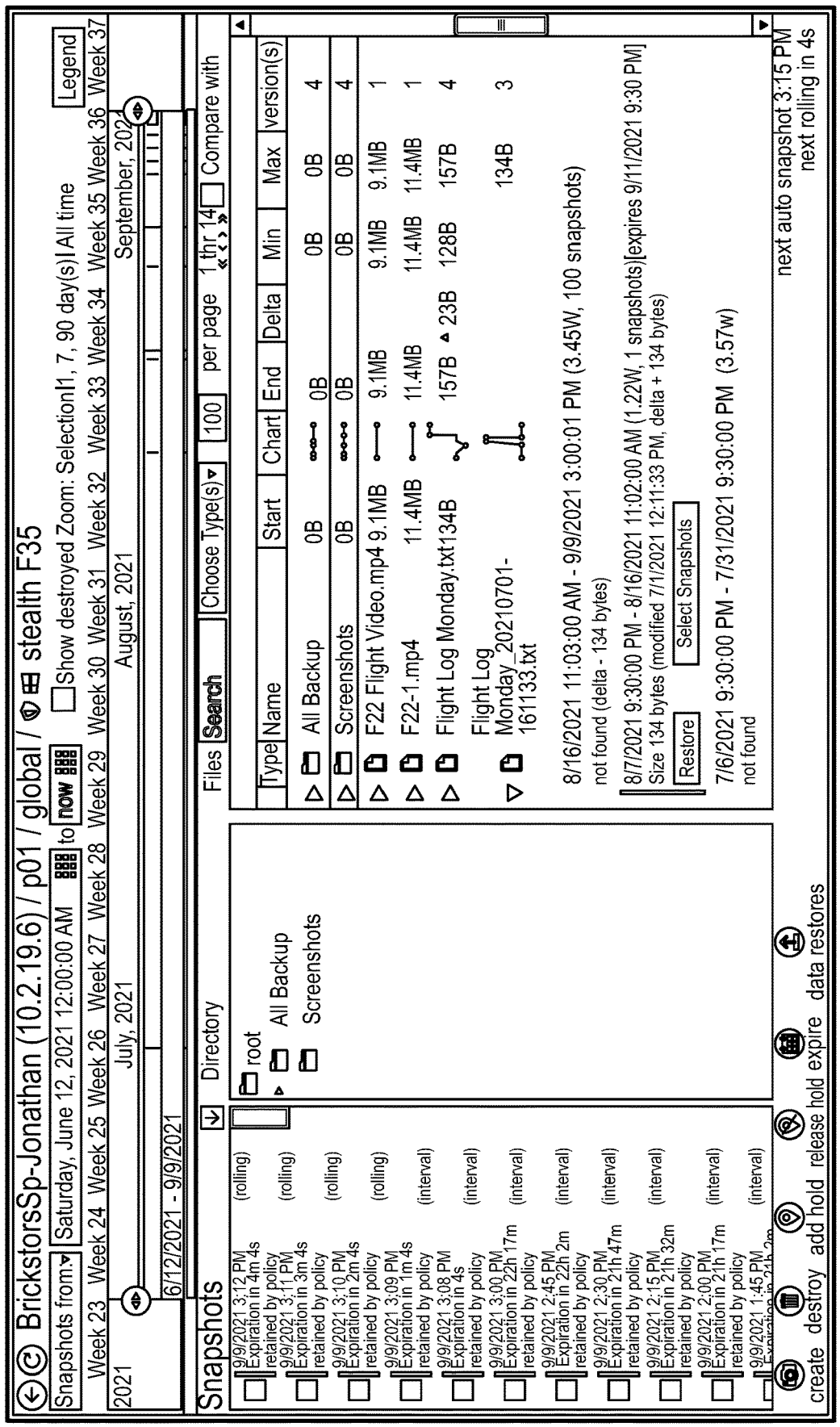
FIG. 6 is a screenshot of example indexing and file restore user interface that is available through the management interface or API call.

The BSP system 100 can also provide unique metadata intelligence services. For example, the BSP system 100 can provide indexing capabilities. The BSP system 100 comprises a metadata intelligence engine, which is comprised of multiple services that index and analyze file metadata. Each file's full metadata is indexed, including all versions in all snapshots, basic file information, magic numbers, access control settings, file type, and location to name a few. This is accomplished across hundreds of millions of files with limited system impact using a patent pending "fast indexing" approach which eliminates the need to re-index data as it is created or modified. Deleted files are also captured and stored to facilitate simple recovery. Indexes are available for all data, accessible via through a management interface or through API calls. An example indexing and file restore GUI 600 that is available through the management interface or API call is illustrated in FIG. 6.

The BSP system 100 enables unique data storage features. A unified global manager can be implemented that allows for global command and control of multiple deployments of the BSP system 100 through a single user interface. This unified management simplifies data management and enables rapid provisioning. Users can search for files and forecast data growth. The unified global manager provides admins with single click executable suggestions for resolving capacity contention or shortages. It is a powerful interface that simplifies storage administration and provides managers with a detailed understanding of return on investment and projected storage needs by department, application, or location.

Figure 7:
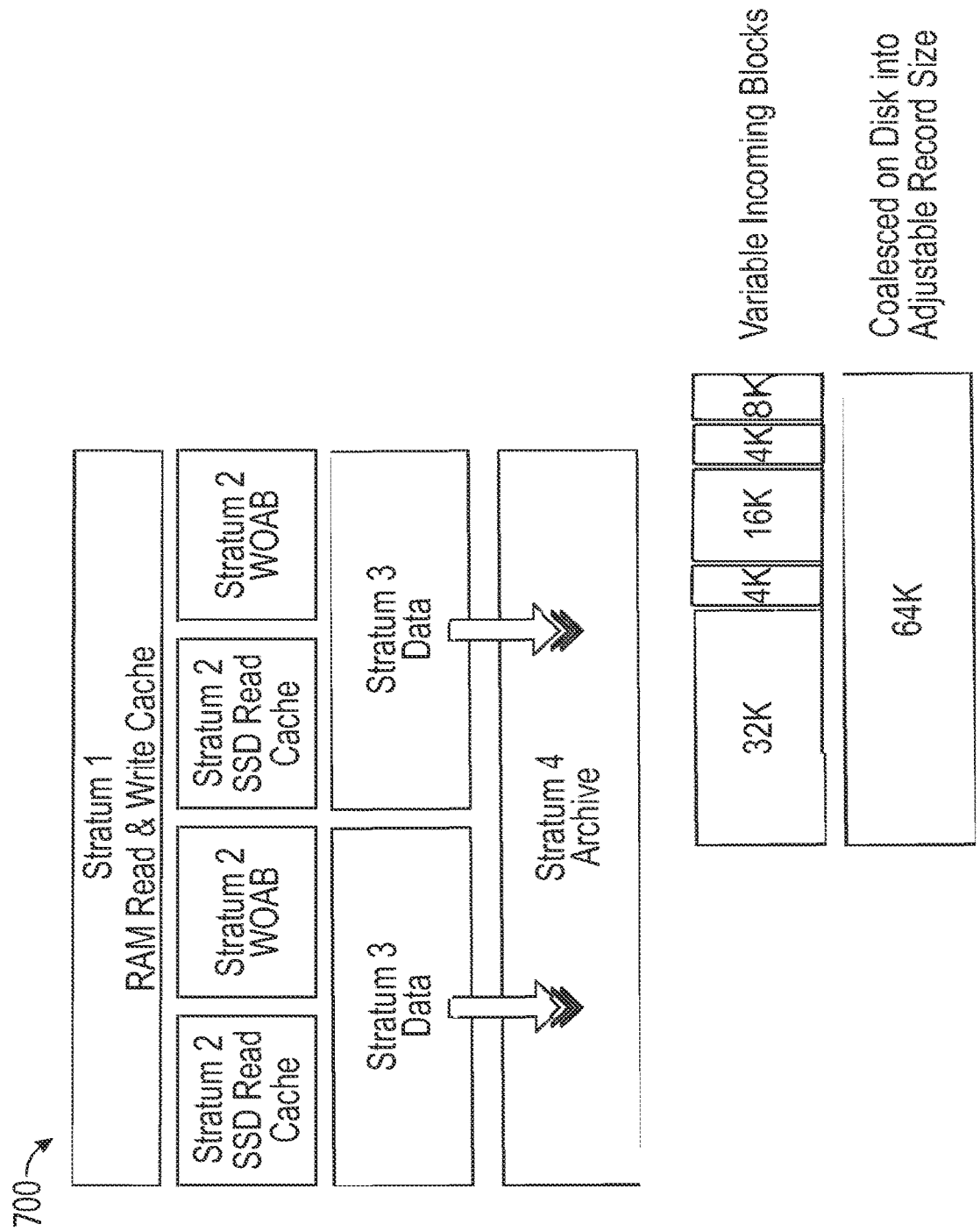
FIG. 7 schematically illustrates an example hybrid storage system.

Referring now to FIG. 7, which schematically illustrates an example hybrid storage system 700. The architecture of the hybrid storage system 700 improves performance while reducing equipment costs. Hybrid storage combines spinning disks with other acceleration components like RAM and SSDs. The hybrid storage architecture leverages a stratified data placement model, providing revolutionary performance and cost benefits. A 4-Stratum architecture can be used to intelligently place data across DRAM, NAND Flash, and spinning disk with an architecture that is optimized for total performance. Typically, 70-80% of data IO requests are serviced by Stratum 1, comprising 100% DRAM at 300× lower latency than NAND flash in a Solid State Disk.

BrickStor SP minimally uses two strata—Stratum 1 for cache and Stratum 3 for data. Stratum 1 is 100% DRAM and is the layer 1 read and write cache. The data stratum can consist of SSDs or hard drives, depending on the use case. A single BrickStor SP appliance can concurrently have a variety of device types in the data stratum to support a variety of workloads and cost constraints. For example, within RackTop's customer base, SSD-only tiers support the most demanding random IO in support of specific relational databases or virtual desktops, while a set of 7200 RPM SAS drives in the data stratum support virtual machines, file shares, and less demanding databases.

Because Stratum 1 is 100% DRAM, it provides the lowest possible latency for shared storage. Stratum 1 cache is scalable to over 1.4 TBs of data per cluster with nanosecond latency. This proportion of Stratum 1 cache to Stratum 3 data capacity is a significant performance differentiator compared to other traditional and hybrid storage arrays, resulting in immediate and long-term cost savings. Write coalescing and transaction groups aggregate incoming blocks in RAM within Stratum 1, writing out to the data stratum in defined intervals to reduce disk thrashing due to intensive random IO. The system can leverage self-tuning algorithms to keep the most frequently and most recently used blocks of data in Stratum 1 to serve read requests with the lowest total latency.

Optional devices in the second stratum further improve read and write performance. The Write Optimization and Acceleration Buffer (WOAB) absorbs the impact of synchronous random I/O to the appliance and shields the data stratum even further from this performance burden. The WOAB offers DRAM latency without volatility, adding latency improvement benefit even to all SSD Stratum 3 configurations.

An optional read cache can be added to Stratum 2. The Stratum 2 read cache (S2RC) extends the capacity of the Stratum 1 DRAM cache acting as a level 2 buffer. The stratum 2 Read Cache will hold blocks of data when there is no longer enough space to hold them in Stratum 1, providing orders of magnitude better performance over a data stratum with SAS hard drives.

The fourth stratum is the archive stratum. Data can be replicated or tiered to this stratum. Transparent Data Movement (TDM) technology can tier data from Stratum 3 to Stratum 4 based on policy. Stratum 4 can take the shape of an archive data pool, another NFS capable storage array, or an object store. Any of these solutions can be located on premises or in the cloud.

Hybrid storage disclosed herein provides stratification model maximizes performance for data devices while allowing administrators to create different resource pools to meet a dynamic range of performance profiles. Pools can be optimized for large streaming data sets, small blocks with a lot of random IO, or archives where data is written and rarely read—ideal to meet mixed workloads in a cloud environment.

The BSP system 100 inherently supports CIFS/SMB, Apple File Protocol, NFS3/4.1/4.2, and iSCSI with no limit on the number of volumes or datasets presented. For security and compliance purposes, the platform focuses primarily on file protocols over client facing block protocols. With client facing block protocols, the data becomes opaque to the BSP system 100, meaning that the system cannot look introspectively into the data to report on items such as user behavior and access control or provide advanced data management features. An example, optimized BSP system deployment with block storage systems requires LUNs to be exposed over fibre-channel or iSCSI and system mounted, with data being shared and accessed through the file system and protocols implemented in the BSP system 100.

The BSP system 100 supports NFS 4.2 context security labels to provide support for mandatory access control as shared storage for SE Linux. With SE Linux and context security labels, the BSP system 100 is a high performance and scalable shared storage solution for multilevel security (MLS) implementations. MLS implementations allow a single storage solution to provide data across multiple domains at different classification levels. This is a critical capability in securing data while enabling cross-domain collaboration.

Getting to the lowest possible cost per gigabyte requires software features to optimize storage efficiency. Compression is a feature that has negligible impact on a system's performance but has an impact on capacity utilization. the BSP system 100 has compression algorithms available for use and leverages the appropriate algorithm for a particular workload. In some instances, a 2X+ capacity savings using the BSP system 100 implementation of LZ4. Each block is compressed independently and all-zero blocks are converted into file holes. To prevent "inflation" of already compressed or incompressible blocks, the BSP system 100 maintains a 12.5% compression ratio threshold below which blocks are written in uncompressed format. This early abort mechanism ensures that time is not wasted trying to compress data that is uncompressible. Not only does the BSP system 100 leverage compression for data on the disk in the data stratum but also in all of the caching stratums mentioned before, which translates into fitting more blocks into cache. Because all of the blocks are moving in a compressed format, the system requires less internal I/O bandwidth, thereby increasing system performance.

As a storage service provider to internal customers, it is often hard to predict or forecast the required storage amount for each customer. Thin provisioning by the BSP system 100 offers a method of oversubscription that allows for more flexible and cost-effective storage allocation analogous to how server virtualization has led to server consolidation. Thin provisioning provides efficient capacity management and space allocation that can result in another 50% savings in capital expenditures by eliminating reserved space. Traditionally provisioned storage systems leave admins with an average of 30% to 50% of their allocated space stranded and unused. Thin provisioning combined with capacity forecasting tools enable administrators to forecast when they will need to acquire new physical storage capacity or reallocate capacity. Reservations can be enabled on a per dataset basis to provide a guaranteed amount of capacity to organizations and network shares.

It is rarely the case where one size fits all. BSP system 100 dynamic block sizing capability ensures that the storage is optimized for the tenant's application workload on an application-by-application basis. With variable block size, space is efficiently utilized both in cache and on storage, having a positive impact to both capacity utilization and reduced I/O overhead. The BSP system 100 supports record sizes ranging from 4K to 1 MB.

Like compression, deduplication is performed inline and at the block level using a hash of the block. Deduplication is transparent to all other layers of the storage system. Unlike compression, there are some performance and resource tradeoffs to consider when leveraging deduplication on any storage array. The BSP system 100 leverages a deduplication table that is held in memory. Setting a smaller block size will increase the probability of deduplication but increase the size of the deduplication table. The BSP system 100 has onboard tools to analyze data on the system to estimate the benefit of enabling deduplication. For data protection reasons, the BSP system 100 keeps the first, second, and fourth copy of duplicative blocks. For highly duplicative environments with deduplication enabled, write performance can actually improve by saving the operation to disk. However, large deletes can take longer than normal because the system needs to check if it is the last block before each delete. Deduplication is always more effective and better performing at the application layer but there are times with very duplicative data that it makes sense to leverage deduplication at the storage layer. The BSP system 100 inline deduplication can be enabled on the fly per volume or dataset that has duplicative data and turned off for datasets that won't receive benefit.

Figure 9:
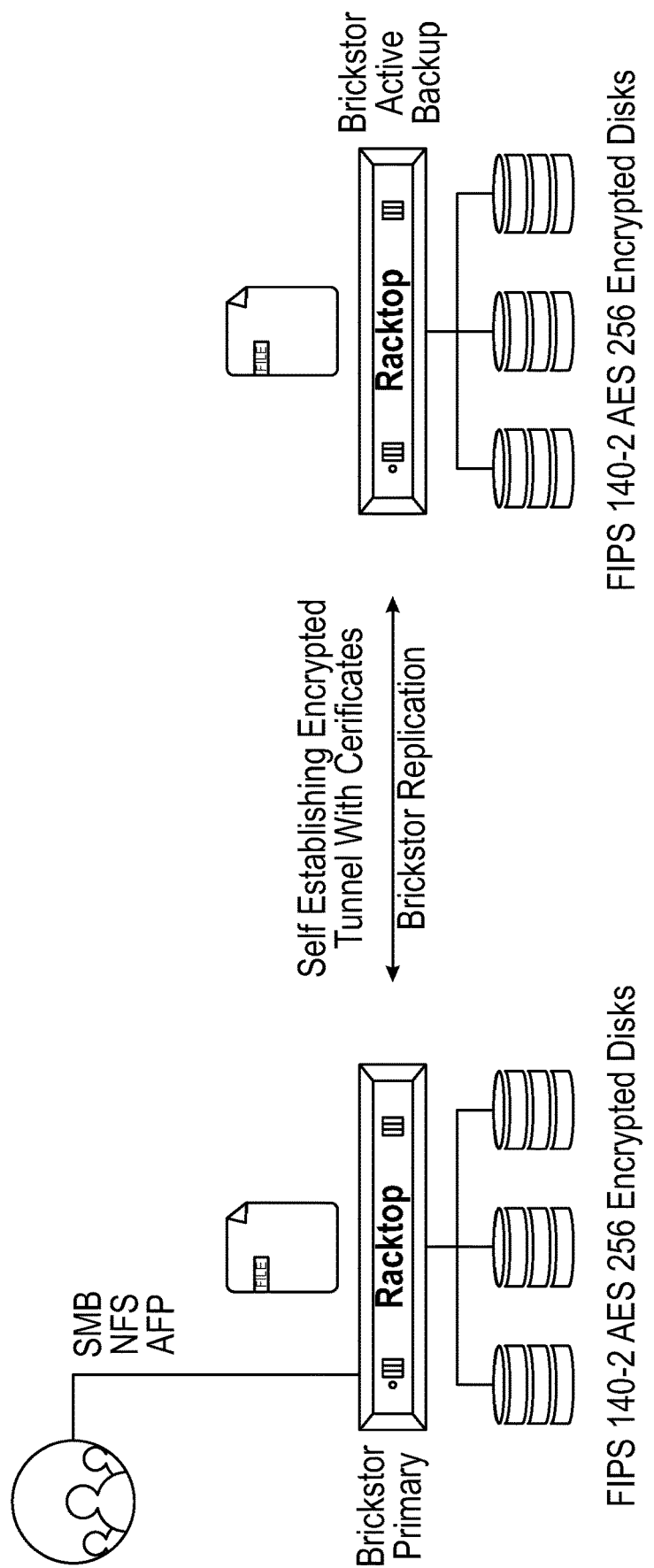
FIG. 9 schematically illustrates the replication of snapshots with encryption between BSP systems.

Data protection policies define how often data is snap-shotted, retained, and replicated. Data is automatically snapped and retained, based on default data protection policies set by the type of storage profile or by user-defined custom data protection policies to meet specific business data protection priorities. FIG. 9, which illustrates an example GUI that identifies various data protection for a BSP system enabled on a datastore.

Figure 8:
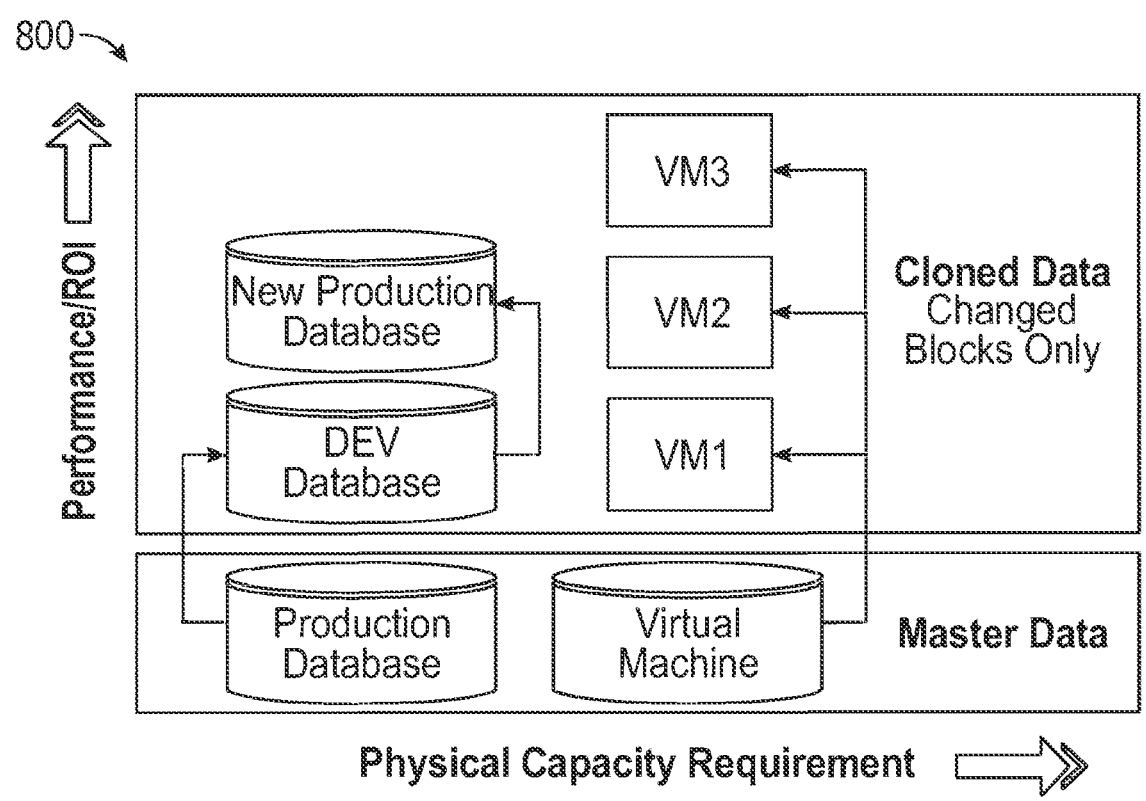
FIG. 8 schematically illustrates a copy on write file system that enables the instantaneous creation of snapshots and clones.

Referring now to FIG. 8, the BSP system 100 can implement a copy on write file system enables the instantaneous creation of snapshots and clones. At creation, there is no additional space required for snapshots. The BSP system 100 does not limit the number of snapshots you can create or retain per system and does not require pre-reserved capacity. This approach enables the rapid restoration of a version of an individual file or virtual machine from within the snapshot. Entire snapshots can be cloned to become operational for disaster recovery and backup purposes. Snapshots are a critical part of the BSP system 100 windowless backup and near zero recovery time objective, which enables true Enterprise disaster recovery and business continuity. Unlike competing file systems whose snapshot mechanisms are susceptible to auto-pruning attacks, the BSP system 100 snapshot mechanism is completely immutable, and policy driven, which eliminates ransomware attacks from destroying snapshotted data.

The BSP system 100 provides unlimited cloning capability that enables the instantaneous creation of zero footprint clones and acts as a pre-emptive, performance increasing, deduplication capability. Clones leverage the same core blocks of data as their parent snapshot, which improves performance and caching, since the BSP system 100 caches the most frequently and most recently used blocks of data in DRAM within Stratum 1.

Clones are a great way to run tests or upgrades against a point in time instance of a database or virtual machine to validate patches and upgrades. In large environments with many tenants, offering a cloning capability allows tenants to create hundreds or thousands of clones of the same baseline image while utilizing nominal additional physical capacity. An example clone management architecture 800 is illustrated in FIG. 8.

An example architecture for replicating data is illustrated in FIG. 9. The BSP system 100 enables Smart Folders, which in real-time converts common directories into unique independent file systems. With Smart Folders enabled, the BSP system 100 automatically creates a unique file system on the fly when the client creates a folder over SMB or NFS. This enables traditional POSIX folders in smart folder datasets to have their own storage profiles, encryption keys, and data protection policies. This is ideal for home directories as an isolated dataset that can be automatically created when a new user account is created. It can also be used with virtualization to create clones of VMs, providing space and performance benefits above and beyond deduplication.

The BSP system 100 provides block and file replication technologies that are WAN-optimized and can securely transmit snapshots between systems. The BSP system 100 block level replication only transmits the changed blocks between snapshots to expedite transmission and reduce bandwidth usage. The BSP system 100 block level replication has dynamic WAN bandwidth throttling, multi-stream transfer for high-latency, high-bandwidth networks, a lottery-based prioritization engine based on the size, importance, and age of data, and the ability to pause and resume replication without starting over. Replication will auto-recover and restart at a checkpoint if interrupted before completing the replication of an entire snapshot. Replication can occur within the same system, or between multiple storage appliances either over a LAN, WAN, or public network in the cloud. Administrators can choose whether they wish to forward and replicate dataset and drive encryption keys to the remote system. The BSP system 100 also supports file level replication to other NAS platforms as well as S3 compliant object storage.

All of the features for tractable disaster recovery are built into the BSP system 100, from data protection policies to replication and file recovery. Integrated disaster recovery features ensure data is always protected and that recovery is faster to achieve (lower RIO) and probability of success is near 100%. The architecture enables users to recover using a second physical BSP system 100 appliance or recover in the cloud.

The BSP system 100 supports a dynamic lottery and priority scheme to ensure the most important data is replicated first, driven from the context of the data, operational factors, backlog, preset priority label, and age. The BSP system 100 has five preset levels of priority. The highest level "Critical" will block other data waiting to be replicated until it has completed. The "High", "Medium", and "Low" binned datasets use a scheme to ensure they are replicated in a fair share manner based on the amount of data to replicate, how long they have been waiting in queue and their relative priority. The lowest priority bin, "Background", will only replicate when nothing else needs to replicate and will be pre-empted by any snapshot with a higher priority level. Snapshots with a "Background" priority are never guaranteed to complete. Admins can temporarily change the priority of a dataset to handle special situations or ensure a specific snapshot is replicated immediately.

The BSP system 100 supports one-to-many global file level replication to enable the movement of files to fit a dynamic number of operational workflows. With the File Reflection service in the BSP system 100, files can be multi-way replicated to another SMB or NFS share, as well as an S3 object store. Data can be replicated and synced between multiple geographies, simultaneously preserving last writer changes.

The BSP system 100 provides high availability using dual controllers connected to shared disks over SAS, or when fronting block storage arrays via a shared LUN over fibre-channel or iSCSI. During normal operations, the controllers participate in an Active/Active cluster mode where each controller is managing IO to one or more pools. Pools are members of a resource group, which consists of an IP and one or more pools. During a failover process, the system moves the resource group from one controller to the other. During a resource group failover, the system removes the IP from the original controller and then advertises on the new controller after the pool(s) are successfully imported and datasets are mounted and shared via the appropriate protocol. This operation can be completed in a rapid manner so that clients do not experience a loss in connectivity to the data store. For example, virtual machines running on the data store can continue to run during a failover operation.

The high availability architecture leverages SSDs for write buffers and read cache. These devices are viewable by both controllers so that there is no data loss in the event of a controller failure or power loss. The BSP system 100 uses RAM as the primary read and write cache, but does not acknowledge that data has been committed to stable storage for a synchronous write until it has been written to the write buffer or the data disk. After data is written to the write buffer, the transaction can be replayed by any controller to write the data correctly to the data disks. The BSP system 100 supports 2-node clusters for high availability, but n-way clustering is also contemplated.

The BSP system 100 supports several RAID schemes. Each pool has an associated RAID scheme, but a system can have multiple pools, each with a different RAID scheme, managed by the same controller or in a cluster.

The BSP system 100 supports mirrored, triple mirrored, single parity RAID, double parity RAID, triple parity RAID and striped (no RAID) RAID schemes. In some embodiments, disks are put into RAID groups called vDevs and then data is striped across one or more vDevs to create a storage pool. When multiple vDevs are striped, it creates a RAID-10, RAID-50, RAID-60 or RAID-70 (triple parity) scheme for the data drives based on the parity level of the vDevs.

The write buffer can be mirrored for protection. Read cache is typically not protected with a RAID scheme because the loss of Read cache will not result in data loss. The BSP system 100 supports hot spares that will automatically be added into a vDev to replace a failed device and begin to rebuild based upon the RAID scheme.

When considering a RAID scheme, it is important to understand the intended workload for the pool. The RAID scheme and the number of drives in the system will affect performance and the usable percentage of raw capacity. For this description, raw IOPS are the IOPS provided by the storage pool without the benefit of caching. In a mirror configuration, each vDev delivers the raw write IOPS of a single device/disk and the read IOPS of both devices/disks since the system needs to write to both disks and read data from only one disk. For single, dual, or triple parity schemes, the vDev only delivers the IOPS of one device/disk because it must write data and read data to all devices in the vDev for a successful read or write operation. To add additional raw IOPS to the pool, the admin must add more vDevs to the Pool. When configuring a pool with a specific number of disks, there is a trade off on usable capacity versus IOPS and latency performance. If an admin were to create a pool out of 24 disks, they have several ways to create pools and leverage all available drives.

When cache is considered, the IOPS of the solution improve drastically even with 7200 RPM SAS Drives. For an HA cluster with two pools and dual 10 Gb Ethernet to each node, the system can deliver 140,000 IOPS for a 32K 50/50 Read/Write Workload. For workloads that require high IOPS with consistently low latency, an all flash pool is an ideal choice. Below are performance metrics that can be demonstrated on pools with mirrored vDevs with current generation SAS flash drives.

For throughput sensitive workloads, the single, dual, and triple parity schemes are effective and economical. In some embodiments, data is written to and read from all disks in the pool to create aggregate bandwidth. The system is intelligent and will automatically bypass the write buffer and write directly to disk for throughput biased workloads. As an additional performance accelerator, the system will intelligently prefetch data for multiple client streams and move the data from disk to cache. The example below shows the example performance of a lidar image modeling workload over SMB using 10 Gb Ethernet. The system is a single host with Dual e5-2620v4 CPUs, 256 GB of RAM. The pool consists of five dual parity 6-disk vDevs. This workload uses 32 client threads to initially load the data and then reads the data to process and model the data.

In day-to-day use, when a damaged block is read and detected, the file system of the BSP system 100 automatically repairs itself by copying data from a known good copy or recreating it from parity blocks. Self-repair occurs on the fly as blocks are read. The BSP system 100 can be scheduled to run a preemptive "scrubbing" process, like ECC memory scrubbing, that operates on live and in-use file systems at low IO priority with minimal performance impact. This is valuable for data that is rarely read and may be susceptible to bit rot on disk. Self-healing eliminates silent data corruption and ensures that blocks of data delivered are 100% intact.

The BSP system 100 can expand and resize pools can be dynamically (up or down) by adding, removing, or growing vDevs to the pool. This means capacity can be expanded at any time without interruption or downtime, and disks can be upgraded in place without any data migration. Write buffers and read cache can also be added or removed from a pool at any time without interruption. Best practices dictate that pools are expanded before they become 70% full. This avoids a large imbalance within a pool where read operations are coming from a subset of the pool vDevs, causing an impact to performance. As new data is written to the pool, it will be written to all disks and vDevs within the pool so that it will automatically begin to rebalance.

Figure 10:
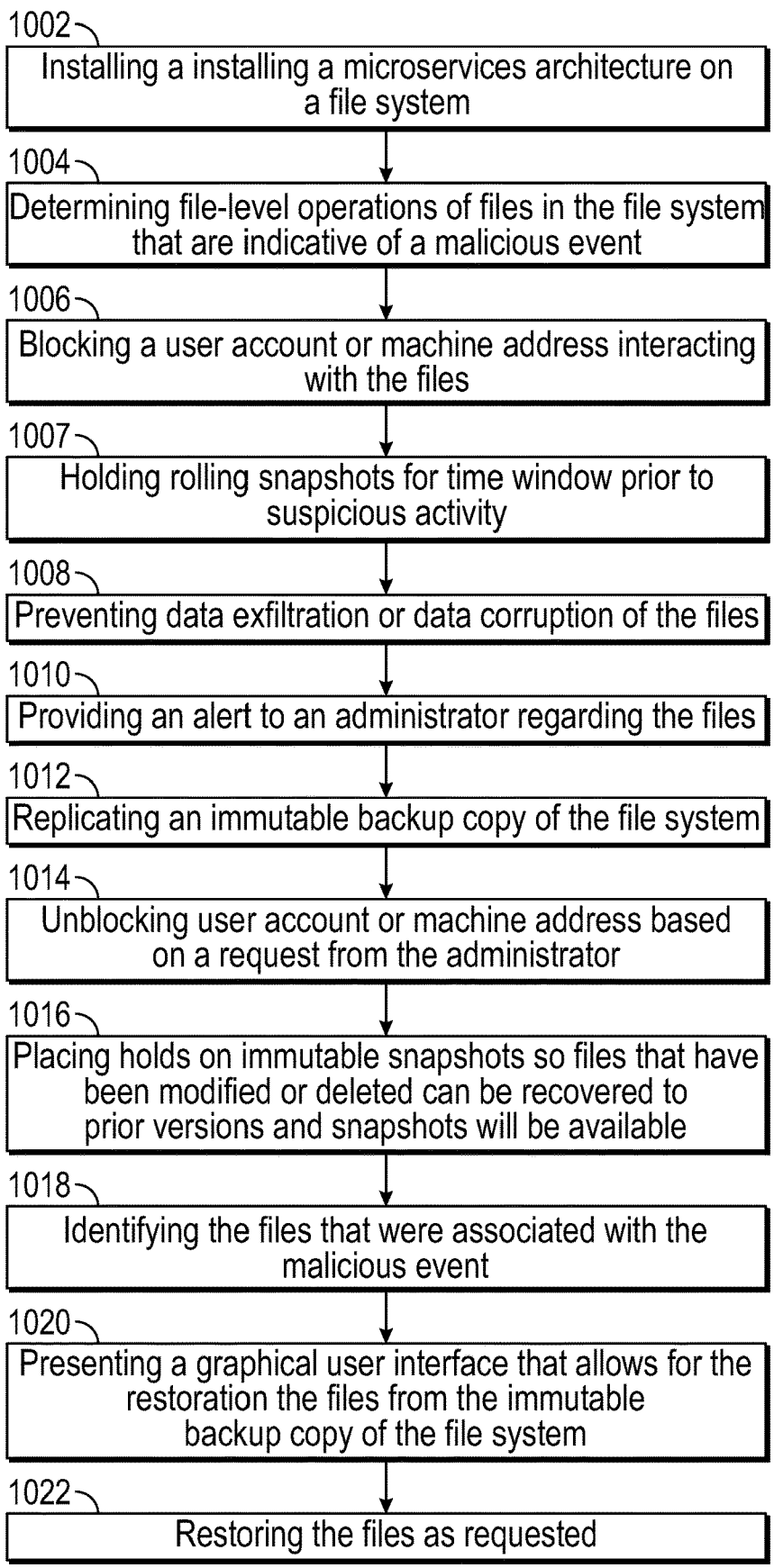
FIG. 10 is a flow chart of an example method of providing cybersecurity active defense.

FIG. 10 is a flowchart of an example method of the present disclosure. The method can include a step 1002 of enabling a microservices architecture on a file system. As noted above, the microservices architecture is configured to protect the file system in a zero trust manner from a malicious attack by a source system. The method can also include a step 1004 of determining file-level operations of files in the file system that are indicative of a malicious event.

The method can include a step 1006 of blocking a user account or machine address interacting with the files, as well as a step 1008 of preventing data exfiltration or data corruption of the files. According to some embodiments, the method can include as step 1010 of providing an alert to an administrator regarding the files. The method can include a step 1012 of replicating an immutable backup copy of the file system.

The method can include a step 1014 of unblocking user account or machine address based on a request from the administrator. This can be based on an admin using a GUI provided by the microservices file system protection service.

The method can include a step 1016 of placing holds on immutable snapshots so files that have been modified or deleted can be recovered to prior versions and snapshots will be available, as well as a step 1018 of identifying the files that were associated with the malicious event. In some embodiments, the method includes a step 1020 of presenting a graphical user interface that allows for the restoration the files from the immutable backup copy of the file system, and a step 1022 of restoring the files as requested.

It will be understood that the order of the steps disclosed in the various methods herein are not intended to be limiting, unless specifically claimed as such. Thus, various steps can be omitted or their order of operations rearranged as would be apparent to one of ordinary skill in the art.

In some instances, the method may include a step of identifying excessive file access events comprising reads, writes and deletes per data set, as well as identifying unusual file access events by a privileged account. One embodiment includes a step of identifying a ransomware event.

According to some embodiments, the method may include establishing a virtual file system and pluggable data mover pipeline, and transmitting files on the pluggable data mover pipeline for external storage in a cloud or other network file system.

In some instances, the method includes establishing an encryption manager that provides a first level of encryption for the files when at rest and a second level of encryption for the files when transmitted, as well as determining a real-time stream of user activity related to the file system, which captures details including an identity, a source IP address, and a protocol.

Figure 11:
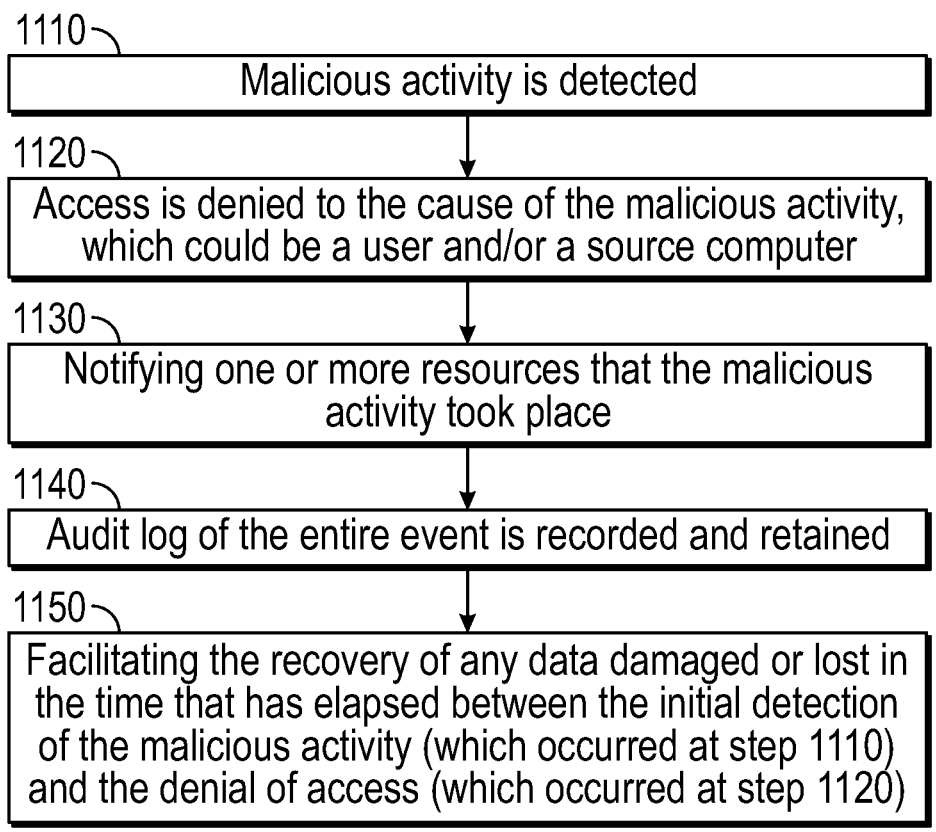
FIG. 11 is a flow chart of another example method of providing cybersecurity active defense.

FIG. 11 is a flowchart of an example method for providing cybersecurity active defense in a data storage system. The method begins with step 1110, where a malicious activity is detected. The malicious activity may be detected utilizing any number of ways and methods, including but not limited to, using attack pattern detection technique, detecting specific ransomware signatures, detecting data exfiltration, detecting that an unusually high volume of data is being accessed or deleted, detecting that an account is being accessed by an unknown system or IP address, detecting that the user's computer has been infected or compromised, and the like.

Then, at step 1120, access is denied to the cause of the malicious activity, which could be a user and/or a source computer. At step 1130, the method continues by notifying one or more resources that the malicious activity took place. At step 1140, an audit log of the entire event is recorded and retained. Finally, at step 1150, the method facilitates the recovery of any data damaged or lost in the time that has elapsed between the initial detection of the malicious activity (which occurred at step 1110) and the denial of access (which occurred at step 1120). As mentioned before, in certain embodiments, the method for providing cybersecurity active defense occurs in real time or in near real time, so the system administrator can be alerted of malicious activities in a timely manner. The system administrator can view what files were accessed by the malicious activity. As one step towards data recovery, the system administrator can revert the data back to the last version saved (via a data snapshot) taken prior to the occurrence of the malicious activity.

Figure 12:
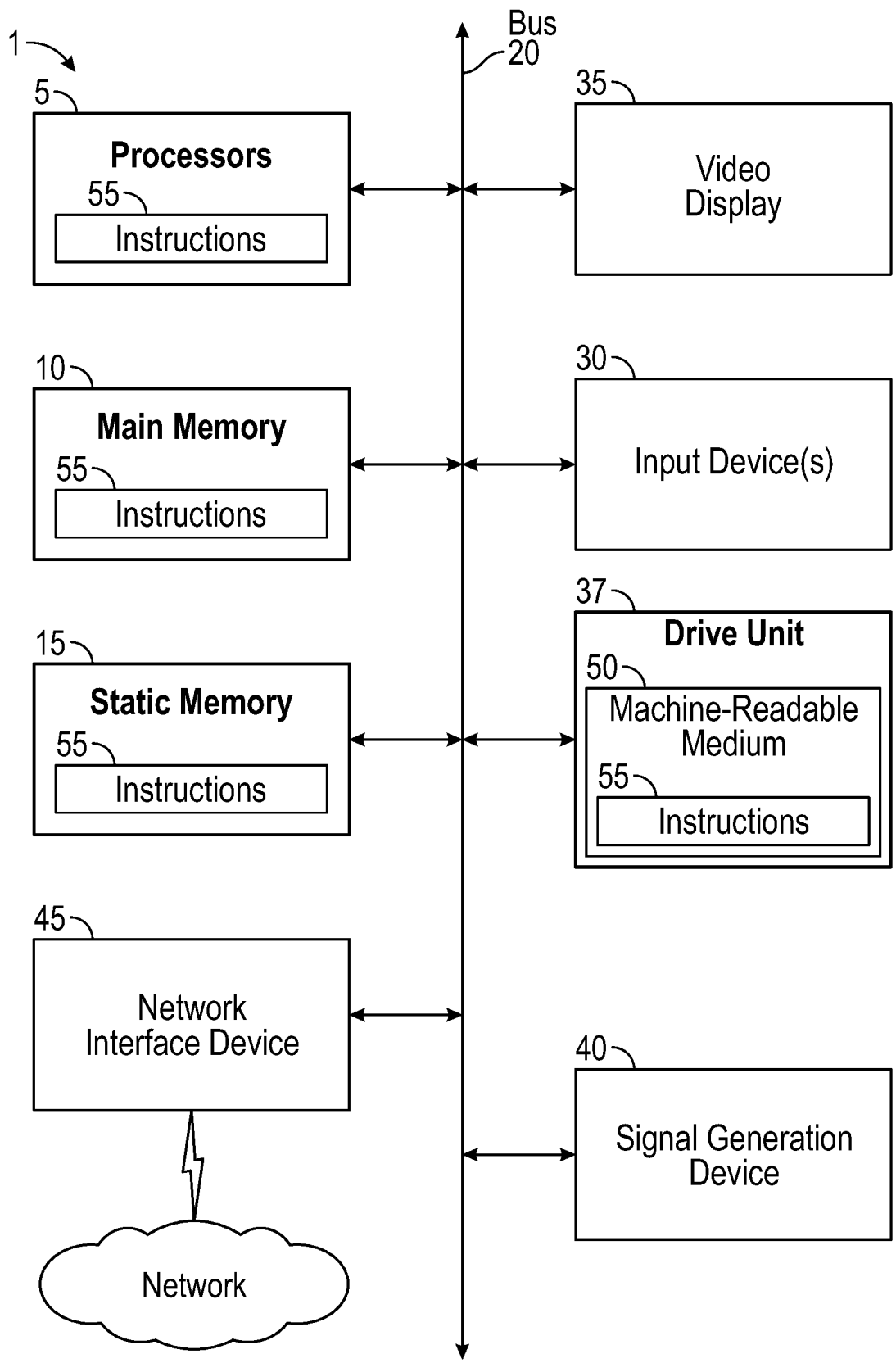
FIG. 12 is a simplified block diagram of a computing system, in accordance with some embodiments.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The invention claimed is:

1. A system comprising:
 a file system; and
 an architecture installed on the file system, the architecture being configured to protect the file system in a zero-trust manner from a malicious attack by a source system, the architecture comprising a controller that is configured to:
  determine file-level operations of files in the file system that are indicative of a malicious event;
  block a user account or machine address interacting with the files over a network;
  prevent data exfiltration or data corruption of the files;
  provide an alert to an administrator regarding the files;
  place snapshot holds on immutable snapshots so files that have been modified or deleted can be recovered to prior versions and snapshots are available;
  identify the files that were associated with the malicious event;
  present a graphical user interface that allows for restoration of the files from an immutable backup copy of the file system; and
  restore the files as requested.

2. The system according to claim 1, wherein the file-level operations of the files in the file system that are indicative of a malicious event comprise excessive file access events comprising reads, writes and deletes per data set.

3. The system according to claim 1, wherein the file-level operations of the files in the file system that are indicative of a malicious event comprise unusual file access events by a privileged account.

4. The system according to claim 1, wherein the controller is configured to determine when the file-level operations are indicative of a ransomware event.

5. The system according to claim 1, wherein the file system comprises a Zettabyte File System and a secure read-only operating system.

6. The system according to claim 1, further comprising a virtual file system and pluggable data mover pipeline that allow for the files to be transmitted for external storage in a cloud or other network file system.

7. The system according to claim 1, further comprising an encryption manager that provides a first level of encryption for data at rest and a second level of encryption for data being transferred.

8. The system according to claim 1, wherein the controller is configured to provide a real-time stream of user activity related to the file system, which captures details including an identity, a source IP address, and a protocol.

9. A method comprising:
enabling a microservices architecture on a network-based file system that provides file access to a plurality of users, the microservices architecture being configured to protect the file system in a zero-trust manner from a malicious attack by a source system;
determining file-level operations of files in the network-based file system that are indicative of a malicious event;
blocking a user account or machine address interacting with the files;
preventing data exfiltration or data corruption of the files;
providing an alert to an administrator regarding the files;
placing snapshot holds on immutable snapshots so files that have been modified or deleted can be recovered to prior versions and snapshots are available;
identifying the files that were associated with the malicious event;
presenting a graphical user interface that allows for restoration of the files from an immutable backup copy of the file system; and
restoring the files as requested.

10. The method according to claim 9, further comprising unblocking the user account or machine address based on a request from the administrator.

11. The method according to claim 9, further comprising identifying excessive file access events comprising reads, writes and deletes per data set.

12. The method according to claim 9, further comprising identifying unusual file access events by a privileged account.

13. The method according to claim 9, further comprising identifying a ransomware event.

14. The method according to claim 9, further comprising:
establishing a virtual file system and pluggable data mover pipeline; and
transmitting files on the pluggable data mover pipeline for external storage in a cloud or other network file system.

15. The method according to claim 14, further comprising:
establishing an encryption manager that provides a first level of encryption for the files when at rest and a second level of encryption for the files when transmitted; and
determining a real-time stream of user activity related to the network-based file system, which captures details including an identity, a source IP address, and a protocol.

16. A method comprising:
detecting malicious activity at a file protocol level of a file system;
denying access to the file system for a cause of the malicious activity;
notifying an administrator of the malicious activity;
generating an audit log of the malicious activity;
placing snapshot holds on immutable snapshots so files that have been modified or deleted can be recovered to prior versions and snapshots are available;
identifying the files that were associated with the malicious activity;
presenting a graphical user interface that allows for restoration of the files from an immutable backup copy of the file system; and
restoring the files as requested.

17. The method according to claim 16, wherein detecting malicious activity includes any of:
using an attack pattern detection technique;
detecting specific ransomware signatures;
detecting data exfiltration;
detecting that an unusually high volume of data is being accessed in the file system;
detecting that an account is being accessed by an unknown system or Internet Protocol address; or
detecting that a client of the file system has been infected or compromised.

18. The method according to claim 16, wherein the method is performed in real time or in near real time.

\* \* \* \* \*